United States Patent [19]

Bonnerot

[11] Patent Number: 5,282,209
[45] Date of Patent: Jan. 25, 1994

[54] DATA WORD TRANSMISSION SYSTEM UTILIZING AT LEAST TWO TRANSMISSION CHANNELS

[75] Inventor: Georges Bonnerot, Les Ulis, France

[73] Assignee: U.S. Philips Corporation, New York, N.Y.

[21] Appl. No.: 804,158

[22] Filed: Dec. 6, 1991

[30] Foreign Application Priority Data

Dec. 21, 1990 [FR] France ............... 90 16105

[51] Int. Cl.[5] .............. H04J 3/12; G06F 11/10; H03M 13/00
[52] U.S. Cl. ................ 370/110.1; 371/37.4; 371/39.1
[58] Field of Search ............ 371/37.1–37.4, 371/2.1, 30, 17, 43, 38.1, 39.1, 50, 8.2, 37.7; 370/58.1, 110.1, 17, 16

[56] References Cited

U.S. PATENT DOCUMENTS

| | | | |
|---|---|---|---|
| 4,276,649 | 6/1981 | Groenendaal et al. | 371/8.2 |
| 4,355,392 | 10/1982 | Doi et al. | 371/43 |
| 4,686,675 | 4/1987 | Morimoto et al. | 371/8.2 |
| 4,737,951 | 4/1988 | Krüger et al. | 370/58 |
| 4,862,457 | 8/1989 | Morimoto | 371/8.2 |
| 4,961,190 | 10/1990 | Nakajima | 371/8.2 |

Primary Examiner—Douglas W. Olms
Assistant Examiner—Chau T. Nguyen
Attorney, Agent, or Firm—Anne E. Barschall

[57] ABSTRACT

This system is formed, on the one hand, by a transmitting section (1) comprising coders (CA, CB, CC) for coding according to an error detection code the data to be transmitted over the main channels and comprising a coder (CS) for an auxiliary channel (CHS) and, on the other hand, a receiving section (2) constituted by error detecting circuits (DA, DB, DC, DS). In the transmitting section there is provided a combining circuit (20) for combining the data to be transmitted over the main channels, whereas the auxiliary channel is used for transmitting the combined data. In the receiving section there are provided decombining circuits (USA, USB, USC) for producing replicas of the transmitted data for each of the main transmission channels on the basis of data transmitted over the auxiliary channel. These replicas are used in case of failing transmission channels.

2 Claims, 1 Drawing Sheet

DATA WORD TRANSMISSION SYSTEM UTILIZING AT LEAST TWO TRANSMISSION CHANNELS

FIELD OF THE INVENTION

The present invention relates to a data word transmission system utilizing a plurality of transmission channels among which at least one main transmission channel and at least one auxiliary transmission channel are distinguished. The system includes, on the one hand, a transmitting section comprising encoders for encoding, according to an error detection code, the data to be transmitted over each main channel and over each auxiliary channel and, on the other hand, at least one receiving section constituted by error detection circuits.

Such a system finds important applications, more specifically, in the microwave domain. In this domain the different channels are frequency channels so that they can undergo the phenomenon of selective fading. This phenomenon often affects only one of the channels. The information signals lost by this channel may also be transmitted over another channel called standby channel or auxiliary channel.

BACKGROUND OF THE INVENTION

A system of this type which does not belong to the microwave domain is described in British Patent Specification 1 532 753. In this prior-art system data organized as binary words are transmitted accompanied by a parity code over a first transmission channel and supplementary data of the same binary words having binary elements of opposite value are transmitted over the auxiliary channel. The comparison on reception of the binary elements coming from transmission channels and auxiliary channels makes it possible to rapidly detect a transmission error.

SUMMARY OF THE INVENTION

The present invention proposes a system of this type in which means are provided for avoiding transmission errors even if the number of transmission channels exceeds one.

Therefore, the system according to the invention is characterized in that there is provided in the transmitting section a combining circuit for combining the data to be transmitted over at least two main channels, whereas at least one auxiliary channel is used for transmitting the combined data, and in that there is provided in the receiving section:
  decombining circuits for producing replicas of the transmitted data for each of the main transmission channels on the basis of the data transmitted over the other main transmission channels and the auxiliary channel,
  switching circuits associated to each main transmission channel for supplying either the replicas or the transmitted data to utilization circuits,
  a control circuit cooperating with the transmission error detection circuits for controlling the switching circuits.

BRIEF DESCRIPTION OF THE DRAWINGS

The following description with respect to the annexed drawings, all given by way of non-limitative example, will make it better understood how the invention may be realised, in which.

DESCRIPTION OF PREFERRED (EMBODIMENTS)

Figure 1:
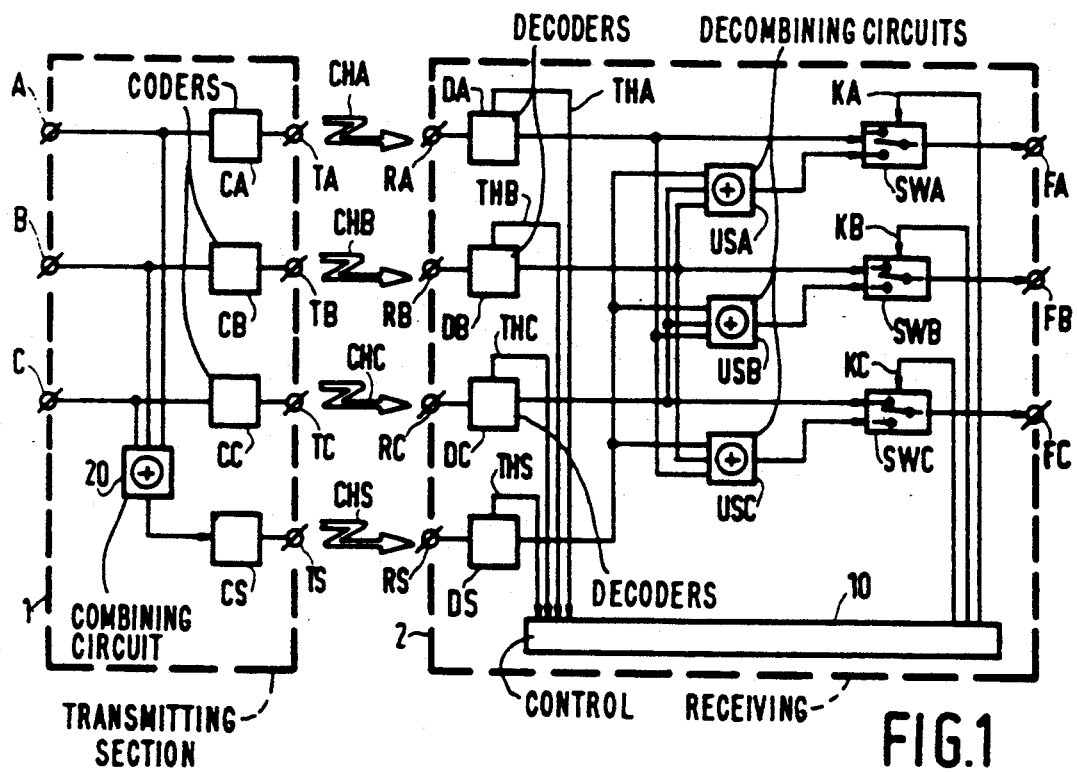
FIG. 1 represents a transmission system according to the invention.

Reference 1 in FIG. 1 denotes the transmitting section and reference 2 a receiving section of the system according to the invention. Section 1 has three accesses A, B, C intended for data to be transmitted over the channels CHA, CHB, CHC represented in this FIG. 1 by means of arrows. These data are synchronous with each other. Another channel CHS transports auxiliary data.

In the microwave domain all the channels are frequency-division multiplex channels and make use of the microwave channel. In case of selective fading one of these channels may be affected and the channel CHS may become the stand-by channel for the failing channel.

In order to take precautions against transmission errors it is necessary to protect the data to be transmitted by error detecting/correcting codes (for example, a Hamming code). This code is applied to the data fed to the terminals A, B, C by means of coders CA, CB and CC; all of them encoded and available at the terminals TA, TB and TC; the modulation and the transmission are not explained because they are conventional and do not form part of the invention. The data received in the receiving section are situated at the terminals RA, RB, RC. At that location decoders DA, DB and DC analyse the received words and produce over the respective wires THA, THB, THC the following signals:
  EC corrected
  ENC presence of non-corrected error, or
  OK no error The invention mainly uses the signal ENC. For differentiating these signals the letter A or B or C or S is put in brackets to differentiate thus the channel CHA, CHB, CHC and CHS. The data at the outputs of the decoders are applied to switching circuits SWA, SWB, and SWC.

The recovered data are available for use at accesses FA, FB and FC. The position of the switching circuits SWA, SWB and SWC is controlled by signals transmitted over the wires KA, KB and KC respectively. These commands are determined by a control circuit 10 on the basis of signals transmitted over the wires THA, THB and THC.

In conformity with the invention there is provided in the transmitting section 1 a combining circuit 20 for combining the data to be transmitted over the channels CHA, CHB and CHC, this combining circuit 20 being a modulo-2 adder. There are also provided decombining circuits USA, USB and USC whose outputs are connected to the switching circuits SWA, SWB and SWC. These decombining circuits form replicas of the received signals, transmitted over the channels CHA, CHB and CHC so that the control circuit 10 controls the position of the switching circuit for obtaining data without errors at the outputs.

The data at the output of the combining circuit 20 are encoded by means of a coder CS which operates in the same manner as the coders CA, CB and CC, whereas on the receiving side, a decoder DS recovers these data while operating in the same manner as the decoders DA, DB and DC.

The decombining circuits USA, USB and USC perform a modulo-2 addition of the data transmitted over CHB, CHC and CHS, over CHA, CHC and CHS and over CHA, CHB and CHS.

The control circuit 10 is devised for:
- connecting the access FA to the outputs of the circuits USA if ENC(A) is active and if ENC(S) is non-active (as well as ENC(B) and ENC(C)),
- connecting the access FA to the output of the decoder DA if ENC(A) is not active.

This also applies to the other accesses.

The present invention is based on the following considerations.

If one considers an instant and if at this instant the data present at the output of the coders CA, CB and CC are called $XA_i$, $XB_i$ and $XC_i$, the data $XS_i$ at the output of circuit 20 can be written as:

$$XS_i = XA_i \oplus XB_i \oplus XC_i$$

$\oplus$: modulo-2 addition.

Let us now assume that $XA_i'$, $XB_i'$, $XC_i'$ and $XS_i'$ are the transmitted data. If there is no transmission error we have:

$$XA_i = XA_i'$$

$$XB_i = XB_i'$$

$$XC_i = XC_i'$$

$$XS_i = XS_i'$$

and it can be proved that at the input the data $XRA_i$ is equal to:

$$XRA_i = XB_i \oplus XC_i \oplus XS_i$$

$$= XB_i \oplus XC_i \oplus XA_i \oplus XB_i \oplus XC_i$$

$$XRA_i = XA_i$$

In the same fashion one may prove:

$$XRB_i = XB_i$$

$$XRC_i = XC_i$$

As the result of the analysis performed by the decoder takes a certain time and is related to a certain number of bits of the transmitted words, delay circuits (shift registers) 50 and 51 are provided in the switching circuits.

Figure 2:
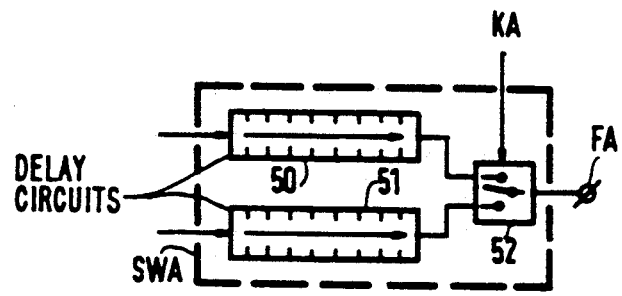
FIG. 2 gives a detailed diagram of the structure of a switching circuit forming part of the system shown in FIG. 1.

FIG. 2 gives a detailed representation of the switching circuit SWA. The input of the circuit 50 is connected to the output of the decoder DA and that of the circuit 51 to that of the circuit USA. The outputs of these circuits 50 and 51 are connected to the inputs of a switch 52 properly termed a two-way switch whose control is connected to the wire KA.

I claim:

1. Data word transmission system utilizing at least three transmission channels, the system comprising
    a transmitting section comprising
        a combining circuit for combining synchronized data to be transmitted over at least first and second ones of the channels which first and second channels are main channels, the combining circuit supplying combined data to be transmitted over a third one of the channels, which third channel is an auxiliary channel, and encoders for encoding, according to an error detection code, the data to be transmitted over each of the transmission channels and,
    at least one receiving section comprising
        error detecting circuits, for detecting errors in data received from the transmitting section;
        decombining circuits for producing replicas of the data to be transmitted over each of the main transmission channels in response to data received from the other main transmission channel or channels and the auxiliary channel,
        switching circuits associated with each of the main transmission channels for supplying either the replicas or the data received from the transmitting section to output means of the receiving section, a control circuit cooperating with the error detection circuits for controlling the switching circuits.

2. Transmission system as claimed in claim 1, characterized in that the combining circuit and the decombining circuits are modulo-2 adders.

* * * * *